Feb. 12, 1929.  
W. C. DE WITT  
1,702,156  
OIL AND AIR FILTER AND LUBRICATOR  
Filed April 8, 1926   3 Sheets-Sheet 1
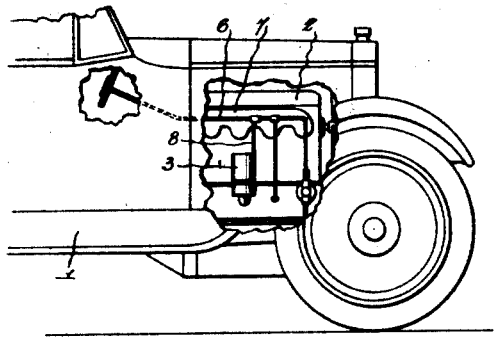
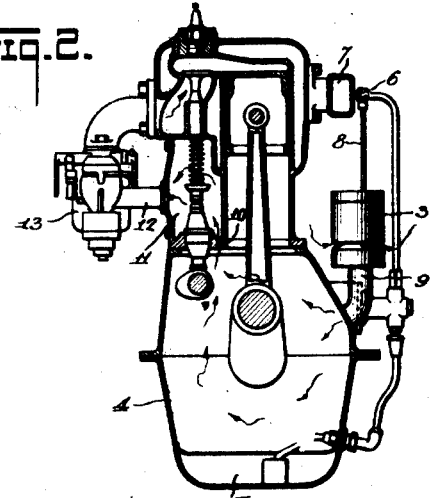
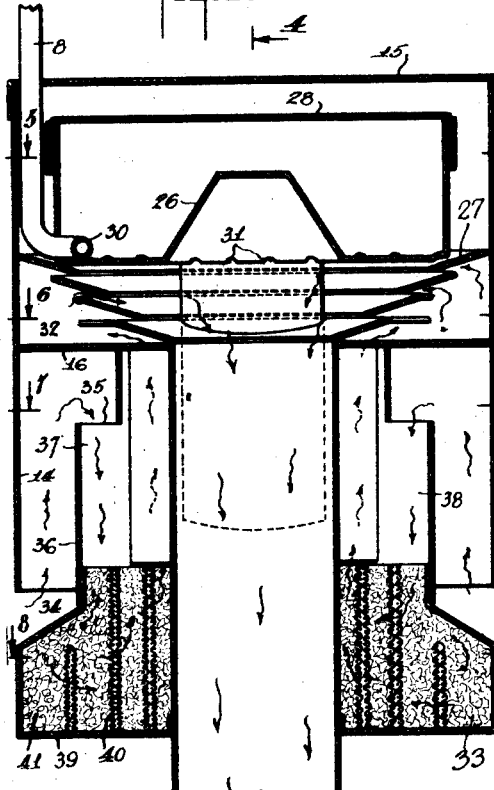
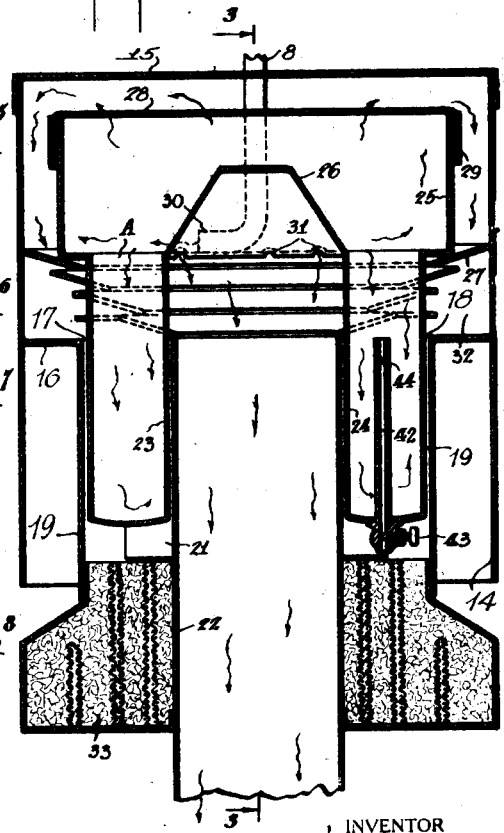
INVENTOR  
William Clauson De Witt,  
BY  
ATTORNEYS Feb. 12, 1929.  
W. C. DE WITT  
1,702,156  
OIL AND AIR FILTER AND LUBRICATOR  
Filed April 8, 1926  
3 Sheets-Sheet 2

INVENTOR  
William Clauson DeWitt  
BY  
ATTORNEYS

Feb. 12, 1929.

W. C. DE WITT 1,702,156

OIL AND AIR FILTER AND LUBRICATOR

Filed April 8, 1926  3 Sheets-Sheet 3

WITNESSES

INVENTOR
William Clauson De Witt.
BY
ATTORNEYS

Patented Feb. 12, 1929.

1,702,156

UNITED STATES PATENT OFFICE.

WILLIAM CLAUSON DE WITT, OF NEWBURGH, NEW YORK.

OIL AND AIR FILTER AND LUBRICATOR.

Application filed April 8, 1926. Serial No. 100,645.

This invention relates to attachments for internal combustion engines and particularly to attachments for automobiles which will act to filter the oil and clean the air used and at the same time provide a certain amount of lubrication.

The object of the invention is to provide an improved construction wherein the lubricating oil is filtered, the air cleaned and the cleaned air caused to convey some of the lubricating oil to the interior of the cylinders and inlet valves for lubricant purposes.

Another object of the invention is to provide an improved oil filter wherein a continuous filtering action is carried out while the oil is in a warmed or heated condition.

A further object of the invention is to provide a combined oil filter and air cleaner wherein the air is caused to pass through cleaning elements and then mix in a certain sense with cleaned oil so that the oil and cleaned air will both flow simultaneously into the crank casing of an engine.

A still further object is to provide an improved construction for automobile engines wherein the oil is filtered and the air cleaned and the cleaned air is caused to pass through the crank casing of the engine and from thence pass the operating part of the valve mechanism to the carburetor so that the carburetor is supplied with cleaned warm air carrying small particles of oil.

In the accompanying drawings—

Figure 1 is a fragmentary side view of the front part of an automobile with certain parts broken away and illustrating the relative position of an embodiment of the invention and the operating parts of the automobile.

Figure 2 is a transverse sectional view through an automobile engine with an embodiment of the invention applied thereto.

Figure 3 is a longitudinal vertical sectional view through a combined oil filter and air cleaner disclosing particularly the air passage-ways, the section being taken approximately on line 3—3 of Figure 4.

Figure 4 is a sectional view through Figure 3 on line 4—4, said figure showing particularly the oil passage-ways.

Figure 5:
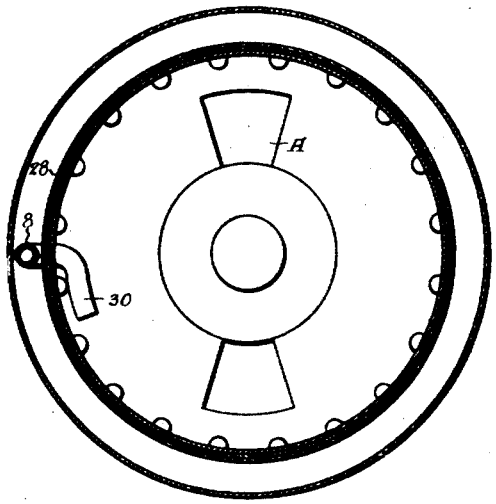
Figure 5 is a transverse sectional view through Figure 3 on line 5—5.
Figure 6:
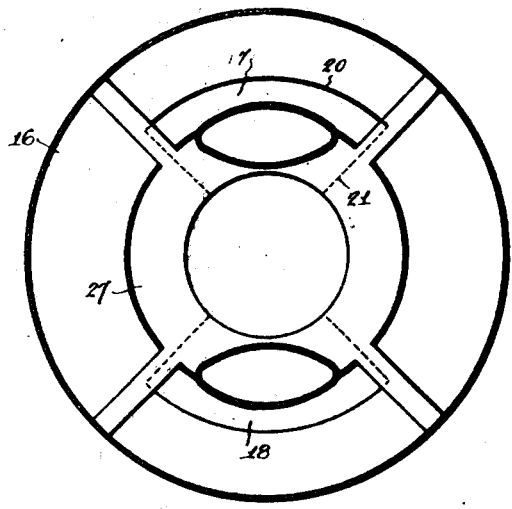
Figure 6 is a transverse sectional view through Figure 3 on line 6—6.

Referring to the accompanying drawings by numerals, 1 indicates an automobile of any desired kind and 2 an engine of a desired type. Associated with the engine 2 is a combined oil filter and air cleaner 3. This device receives the air from the atmosphere and passes the same into the crank case 4 as shown in Figure 2. The oil is pumped from the sump 5 upwardly to a short section of pipe 6 arranged adjacent the exhaust manifold 7 and from this pipe 6 the oil passes downwardly through pipe 8 and into the combined oil filter and air cleaner 3. By this method, the heavier and dirtier portions of the oil in the crank case are removed, heated somewhat to make the same more liquid and then filtered, after which the cleaned or filtered oil passes downwardly through the pipe 9 into the crank case 4; while this is taking place cleaned air also passes downwardly through pipe 9 into casing 4 from which it escapes through one or more apertures 10 into the chamber 11, which chamber is substantially air-tight and is arranged adjacent the cylinder so that the air is heated as it passes through this chamber. The valve springs and part of the valve stem extend into chamber 11 so that the air passing through this chamber comes in contact with these parts and as the air carries with it a few drops of finely divided oil from the crank case 4, these parts will be properly lubricated while the air is being heated. The air and a very small part of the oil will pass through the pipe 12 into the carburetor 13 and from thence into the intake manifold of the engine. From the intake manifold of the engine the explosive mixture is distributed to the various cylinders in the usual manner and as there is a very small quantity of oil with the air, this small quantity of oil will be likewise distributed to the cylinders so that the intake manifold and the interior cylinders are lubricated to a certain extent.

It is to be noted that the crank in case 4 produces the usual splashing action and this splashing action produces a finely divided spray of oil and the finest parts of this spray are picked up by the air which passes through the openings 10. Preferably, there are a number of very small openings 10 so that an excessive amount of oil is held back or prevented from entering chamber 11 though the air may freely enter and pass therefrom into pipe 12. In this way clean air is supplied to the carburetor so that no dirt and dust will enter the cylinders of the engine and in addition a very small quantity of oil finely divided, is passed into the carburetor to the cylinders.

Figure 7:
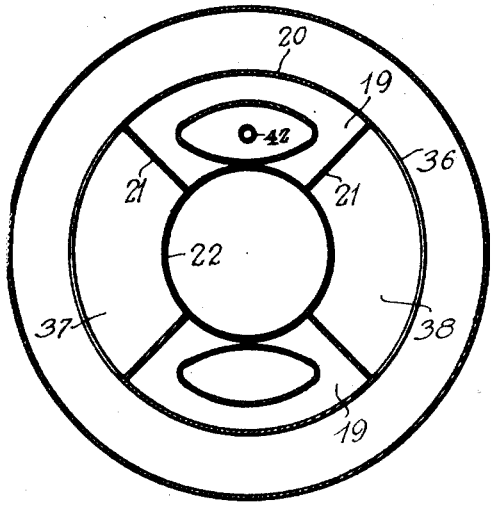
Figure 7 is a transverse sectional view through Figure 3 on line 7—7.
Figure 8:
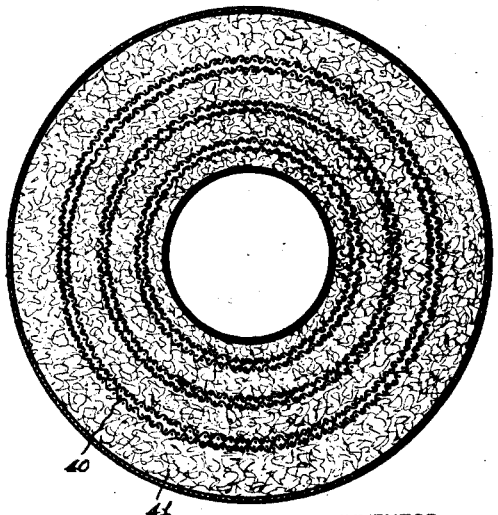
Figure 8 is a transverse sectional view through Figure 3 on line 8—8.

The interior construction of the combined oil filter and air cleaner is shown in Figures 3 and 4, Figure 3 showing particularly the circulation of the air while Figure 4 shows particularly the movement of the oil. Referring to these figures by numerals, 14 indicates a casing which is preferably tubular and which is provided preferably with a removable top or cover 15. Arranged intermediate the ends of the casing 14 is a partition 16, which partition is provided with openings 17 and 18. Associated with each of these openings is a depending tubular structure 19, soldered or otherwise rigidly secured to the partition 16 and extending downwardly preferably a short distance below the casing 14. In fact the member 19 which forms a vertical passage-way, is composed of an outer arc-shaped member 20, (Fig. 7) two radiating members 21 radiating from the central tube 22, which central tube forms the inner wall of the passage-way. There is a member 19 on diametrically opposite sides of the tube 22 as shown in Figure 4 and these members loosely receive the depending sediment wells 23 and 24 opening into the filter body 25. The filter body 25 is an annular member having a closed bottom except for the parts that open into members 23 and 24, said bottom having an upwardly extending section 26 over the tube 22. The bottom of the member 25 is spaced from the tube 22 by reason of the fact that member 25 rests on one of the rings 27. This will permit air to pass freely between the various rings 27 as well as oil, said air and oil passing into the tube 22 from which it is discharged into tube 9 and from thence into the casing 4. A filtering member 28 is connected with the upper part of member 25, said filtering member being any desired filtering substance, as for instance, chamois skin, held in place by the clamping ring 29. Oil from the tube 8 passes downwardly and then into the bottom of body 25 by reason of the fact that the lower end of pipe 8 extends into the body 25 and then is formed with a right angle section 30 which is almost parallel with the outer wall of body 25. This will give the oil a circulating movement as it is discharged from the pipe 8. As the oil moves, the heavier particles and particularly the foreign matter will drop by gravity into the wells 23 and 24 while most of the oil passes upwardly through the chamois skin 28 and from thence downwardly outside of body 25 to the top rings 27 and over the top rings 27 through the pressed out portions or grooves 31 onto the upper surface of the next ring 27 and so on until it passes into the tube 22. It will be noted that the oil passes over the rings 27 whereas the air passes between these rings as the air passes from the chamber 32 instead of from above the top ring 27. The chamber 32 is in free communication with the members 19 which form passage-ways from the filtering structure 33, which filtering structure is supplied with air as shown in Figure 3. It will be noted that the air passes in the annular opening 34 to the interior of the casing 14 and from thence through the opening 35 into the annular tubular member 36. The outer wall 20 (Fig. 7) forms part of the annular tubular member 36 so that this tubular member is divided into four vertical passage-ways, namely, passage-ways which merge into the openings 17 and 18 and the respective passage-ways 37 (Fig. 4) and 38 (Fig. 3) which receive air through the openings 35. The passage-ways 37 and 38 discharge into the air cleaner 33 and the air cleaner in turn permits the air to pass into the passage-ways formed by members 19. The air cleaner structure 33 is composed of a sheet metallic container 39 having a plurality of rings 40 of fine wire mesh and between these rings there is arranged a filling 41 of cotton or other fibrous material. This material may be the full height of the rings 40 or only part the height of these rings so that the air must pass through the wire mesh rings and some of the fiber before it can enter the passage-ways formed by members 19. The fiber 41 is preferably maintained moist by oil passing through the pipe 42 which has a lead-in valve 43. The pipe 42 is provided with a number of openings 44 near the upper end, which openings are always above the dirt and foreign matter carried by the wells 23 and 24. It will be understood that the parts are so adjusted that a drop of oil only occasionally passes into the fiber 40. In this way the fiber is not saturated but supplied with a sufficient quantity of oil to cause foreign matter to readily adhere thereto while permitting the air to escape and pass upwardly in a clean condition through the members 19 into chamber 32. From this chamber, the air passes between the plates 27 and from thence down through tube 22.

The container 39 and parts arranged therein may be readily removed as the same may be held in place merely by having the upper part frictionally engaging the member 36 and the lower part frictionally engaging the tube 22 or these parts may be held in place by other means, as for instance, by a threaded section. The cover 15 is also removed and when it has been removed the body 25 and associated parts may be readily removed after first disconnecting pipe 8 from pipe 6. In this way all of the parts may be readily examined for cleaning or repair and then re-assembled to secure the desired function of filtering the oil and cleaning the air.

In Figures 9 to 13 inclusive, will be seen a slightly modified construction of the lower part of the device 3. In this form of the invention, the container 39' is secured in place by suitable threads 45. It will be noted that the container 39' is made really in two sections, namely, section 46 and section 47 connected together by a threaded portion 48. In addition, the tube 22' is rigidly secured to section 47 and telescopically fits over the lower part of tube 22'. In this form of the invention, there is provided a solid disk 49 which is provided with suitable openings 50 merging into the passage-ways 51 which in turn register with the passageways formed by structure 19 so that air may pass upwardly through the openings 50, passage-ways 51 and through the passageways formed by the structure 19. In this form of the invention the air enters the opening 34 and passes upwardly in a similar manner to the way it is shown in Figure 3 and then downwardly in a similar manner but instead of passing directly into the container 39 as shown in Figure 3, it strikes the plate 49 and is deflected by the members 52 so as to be given a spiral or circular movement as it passes over the outer edge of the disk 49. It will be noted that the wire mesh rings 40' do not extend upwardly to the disk 49 and also the fibrous filling 41' extends up only a short way along the rings 40'. By reason of the whirling motion of the air as it passes beneath the disk 49 it will strike the various rings 40' and the dust and foreign matter will drop to the fiber 41 which is saturated with oil and which thereby holds the dust while the clean air may pass freely through opening 50 and upwardly therefrom.

Figure 9:
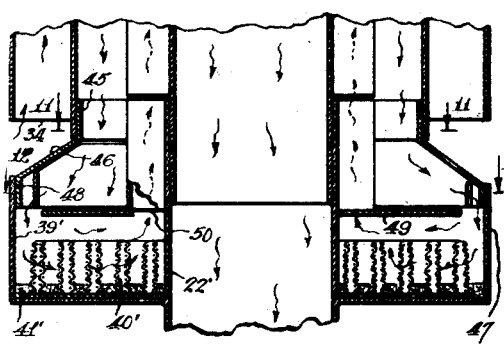
Figure 9 is a fragmentary sectional view similar to the lower part of Figure 3 but showing another form of the invention.
Figure 10:
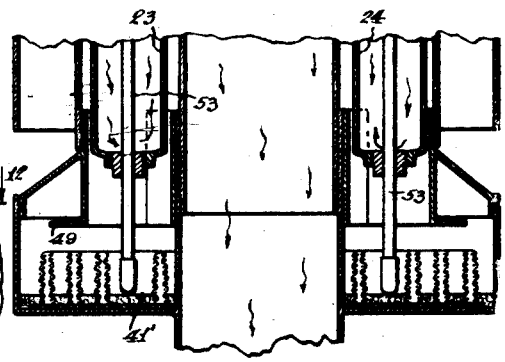
Figure 10 is a view similar to the lower part of Figure 4 but showing the same invention as illustrated in Figure 9.
Figure 11:
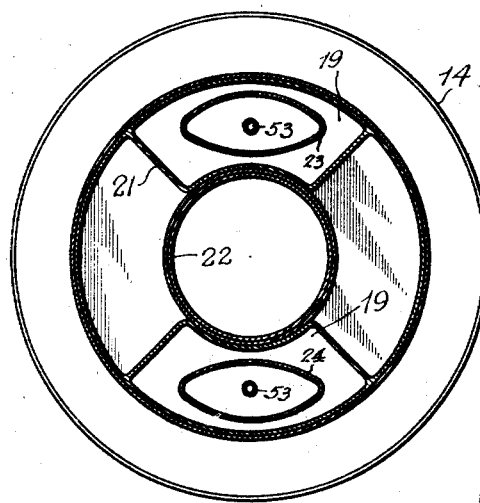
Figure 11 is a sectional view through Figure 9 on line 11—11.
Figure 12:
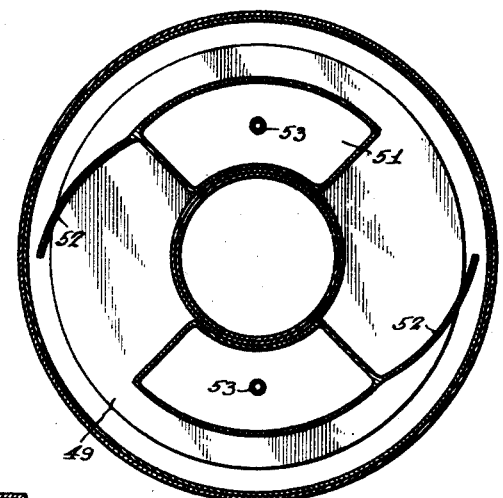
Figure 12 is a sectional view through Figure 9 on line 12—12.
Figure 13:
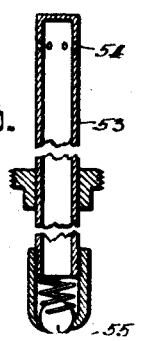
Figure 13 is an enlarged vertical sectional view through an air feed embodying certain features of the invention.

It will be noted from Figure 9 that there is a small space between disk 49 and the upper ends of the rings 40' but this will not prevent the air from being cleaned as the air must change directly sharply and, consequently, the momentum of any particles of dust will carry the same down into the various wire mesh rings and eventually against the cotton 41'. As indicated in Figure 10, oil carrying pipes 53 are carried by the members 23 and 24, said pipes extending downwardly through the bottom of these members and through the passageway 51 until the lower part touches the fibrous or cotton filling 41'. Each of the pipes 53 is provided with a series of apertures 54 near the upper end and with a spring pressed ball valve 55 at the lower end, said ball valve pressing somewhat against the fiber 41' so that there will be always a slight leakage which will maintain the fiber 41' in a moist condition.

From an examination of Figures 3 and 4, it will be observed that the air from the atmosphere passes inwardly and between the various plates 27 and finally downwardly through the pipe 22. While this is taking place, the filtered oil will pass upwardly through the cleaning member 28 and then downwardly over the upper surfaces of the rings 27. Oil will drop from one ring to the other and eventually passes downwardly through pipe 22. By this location of the parts and this construction, the heated oil will warm the cool air coming in and the reverse will also be true, the oil striking the air as the air passes from plates 27 will become heated so that warm air is supplied to the crank case and cooled clean oil.

During the usual operation of an internal combustion engine, some of the gasoline leaks by the piston and dilutes to a greater or less extent the oil in the crank case. It is also well known that in starting an internal combustion engine, the vaporized gasoline condenses somewhat in the intake manifold and, consequently, some raw gasoline is fed into the cylinders, which under some circumstances, passes the piston and enters the crank case. At all times there is something of a leakage past the piston and, consequently, care must be taken to supply new oil from time to time or other means must be provided to prevent too much dilution of the oil. In the present invention, it will be noted that the cleaned and warmed air entering the crank case passes across the crank case and in this passage will gather up any gasoline vapors or raw gasoline escaping past the piston and will carry these vapors and raw gasoline back into the carburetor. As the air is continually passing through the crank case, there is continually a cleaning action as far as removing the gasoline is concerned and, consequently, the oil in the crank case is not diluted by gasoline and will therefore, function in a more efficient manner. Referring again to the oil carrying pipes 53, it will be noted that they are each provided with an enlargement or plug externally threaded and screwed into place. This permits a ready cleaning of the precipitate or sediment from the oil filter as this plug, together with pipes 53, may be unscrewed after the member 47 and associated parts have been removed.

What I claim is:

1. In a combined oil filter and air cleaner, a casing, air cleaning means arranged in the lower part of the casing, oil filtering means arranged in the upper part of the casing, means forming a chamber between the oil filter and the air filter, means providing a centrally positioned discharge pipe opening into the lower part of said chamber, means forming a passage-way from the exterior of the casing to said cleaning means, means forming a passage-way from said cleaning means, said chamber, and means for directing the filtered oil from said filtering structure to said chamber and means in the chamber for directing the oil and air to said discharge pipe whereby the filtered oil and cleaned air will be both discharged through said pipe.

2. A combined oil filter and air cleaner comprising a casing, a cleaning element arranged adjacent the bottom of the casing, means forming a passageway to the cleaning element for permitting air to enter therein, means for directing air from the cleaning element, means in the casing forming a chamber for receiving air from the cleaning element, a centrally positioned pipe for discharging air from the device, a series of spaced annular rings arranged above the pipe and in said chamber for directing the air into the pipe, and an oil filtering member positioned on the top ring above said pipe, said oil filter being formed with means for filtering oil, which after the same has been filtered will pass over the exterior thereof and onto the upper surface of the top ring and from thence over part of the upper surface of the other ring and finally out through said pipe.

3. In a combined oil filter and air cleaner for internal combustion engines, a casing, means associated with the casing for presenting an air cleaning element, said means including structures presenting an air passage-way, an air outlet passage way, a fibrous filtering member, and a series of concentric rings of wire mesh dividing said fibrous filtering member into annular members, a pipe extending from said casing and in communication with said an outlet-passage-way so that air passing through the filtering member and through said wire mesh rings will eventually pass through said pipe, an oil filtering structure arranged above said pipe and positioned so that the filtered oil will be discharged into said pipe, and means carried by the filtering structure for supplying a small quantity of oil to said fibrous filtering member so as to maintain the same moist.

4. A combined oil filter and air cleaner comprising a casing, an oil filtering member arranged in the casing, an air cleaning member arranged in the casing formed with a fibrous filtering element, a pipe for receiving and discharging the air from the cleaning member and the oil from the filtering member, and means for connecting the oil filtering member with the air cleaning member, said means acting as an oil supply for supplying said fibrous filtering element with a limited amount of oil to maintain the same moist and thereby retain dust and other particles carried by the air.

5. An oil filter, comprising an oil receiving container open at the top, a filtering sheet extending across the open top of said container, means for securing the edges of the filtering sheet to said container, said container being formed with a plurality of settling pockets for receiving foreign matter, a tubular member for directing oil to said container near the bottom thereof, said oil being adapted to pass upwardly through said filtering sheet and downwardly over the outside of said container under the action of gravity, means for aerating the filtered oil, and means for directing the aerated and filtered oil to a discharge point.

WILLIAM CLAUSON DE WITT.